United States Patent [19]

Antinoro et al.

[11] Patent Number: 5,149,226
[45] Date of Patent: Sep. 22, 1992

[54] FLEXIBLE OIL SPILL CONTAINMENT BOOM

[76] Inventors: James E. Antinoro, 1600 SW. 20th Ave.; James A. Antinoro, 613 SW. 22nd Ter., both of Ft. Lauderdale, Fla. 33312; Randy D. Antinoro, 1711 SW. 23rd St., Ft. Lauderdale, Fla. 33316

[21] Appl. No.: 626,951

[22] Filed: Dec. 12, 1990

[51] Int. Cl.$^5$ .............................................. E02B 15/04
[52] U.S. Cl. ........................................ 405/65; 405/63; 405/72
[58] Field of Search ................ 405/60, 63, 64, 65, 405/66, 72; 114/219; 210/923

[56] References Cited

U.S. PATENT DOCUMENTS

| | | | |
|---|---|---|---|
| 3,146,598 | 9/1964 | Smith | 405/66 |
| 3,599,434 | 8/1971 | Missud | 405/68 X |
| 3,766,739 | 10/1973 | MacLean | 405/65 |
| 4,000,532 | 1/1977 | Nielsen | 114/219 X |
| 4,068,478 | 1/1978 | Meyers et al. | 405/66 |
| 4,269,538 | 5/1981 | Hauan | 405/63 |
| 4,430,955 | 2/1984 | Jaffrennou et al. | 405/63 X |
| 4,765,602 | 8/1988 | Roeseler | 267/148 |
| 4,960,347 | 10/1990 | Strange | 405/63 |

FOREIGN PATENT DOCUMENTS 189188  4/1964  Sweden ............................. 405/60

Primary Examiner—Dennis L. Taylor
Assistant Examiner—John A. Ricci
Attorney, Agent, or Firm—Malin, Haley, McHale, DiMaggio & Crosby

[57] ABSTRACT

An oil spill containment boom deployable normally by one person between a pier and vessel especially useful for oil transfer operations from ship to shore that will remain in position on the water regardless of changes in the ship draft comprising a floating flexible barrier having an elongated unitary tensioning member disposed from end to end and held in place by strategically positioned sleeves connected over areas of the float to hold the barrier in place.

13 Claims, 3 Drawing Sheets

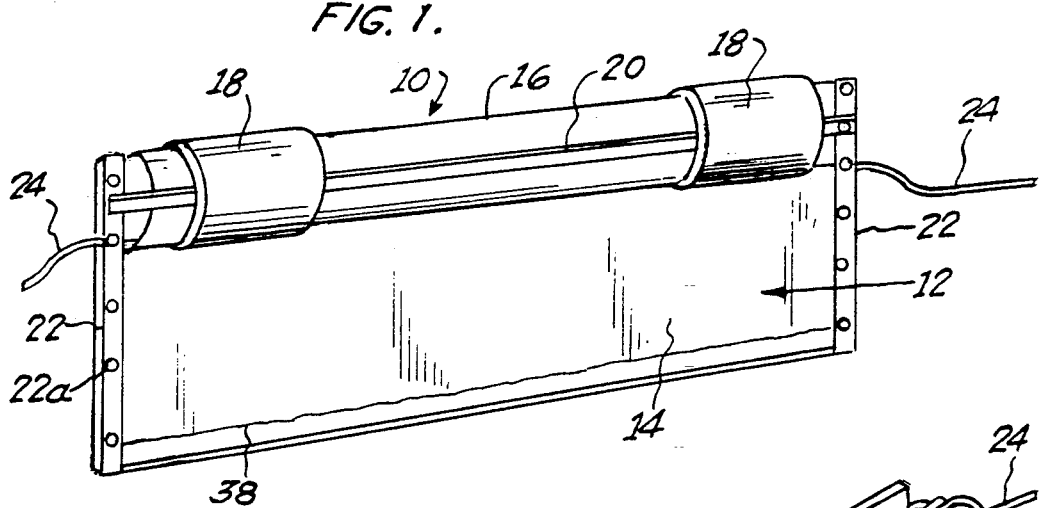
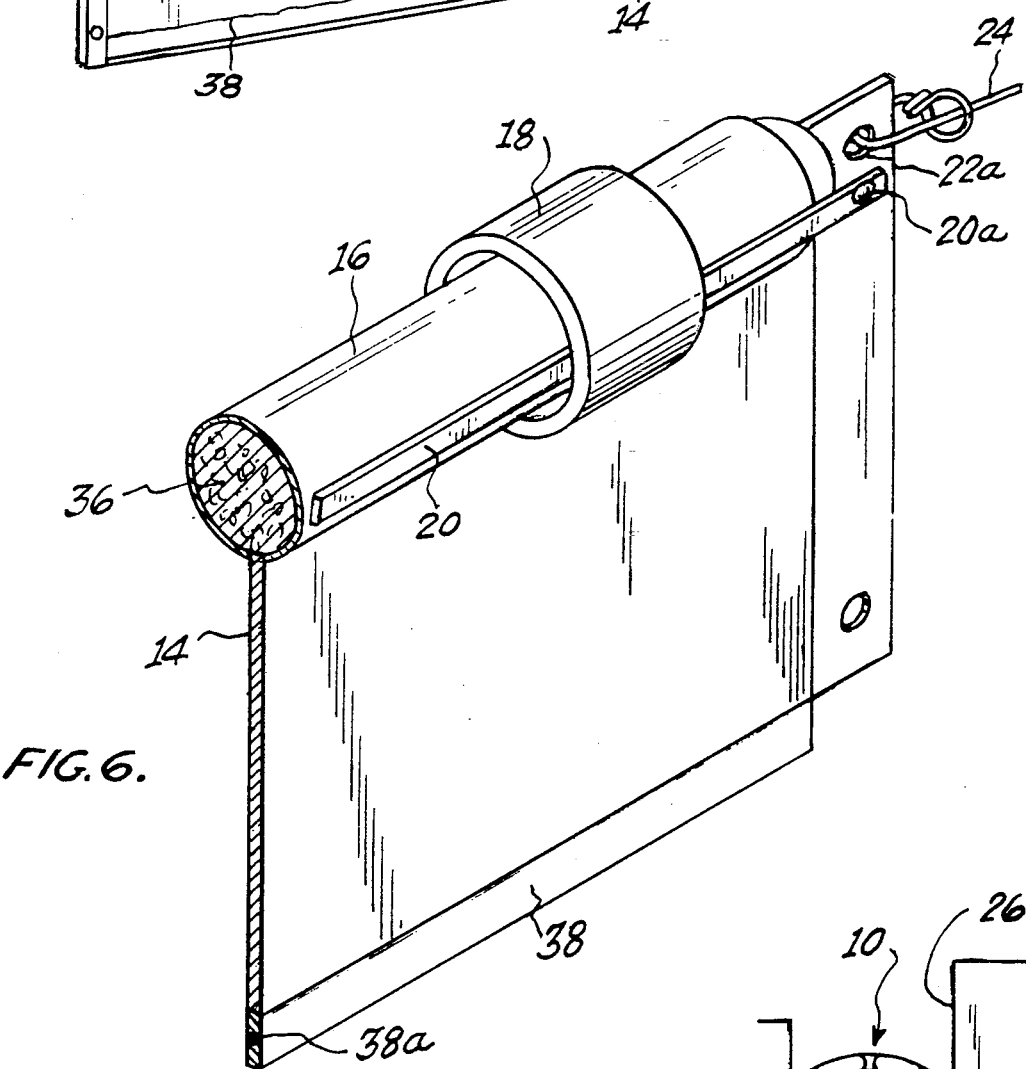

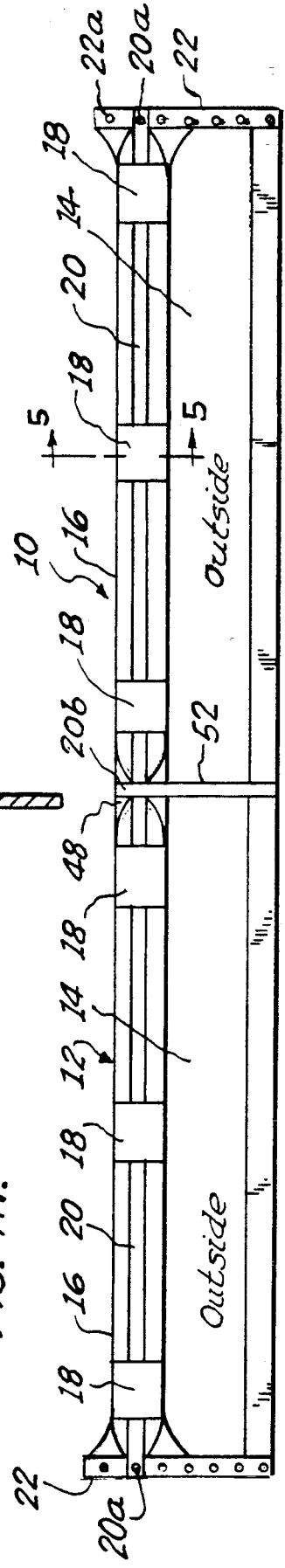
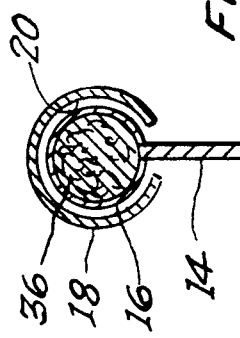
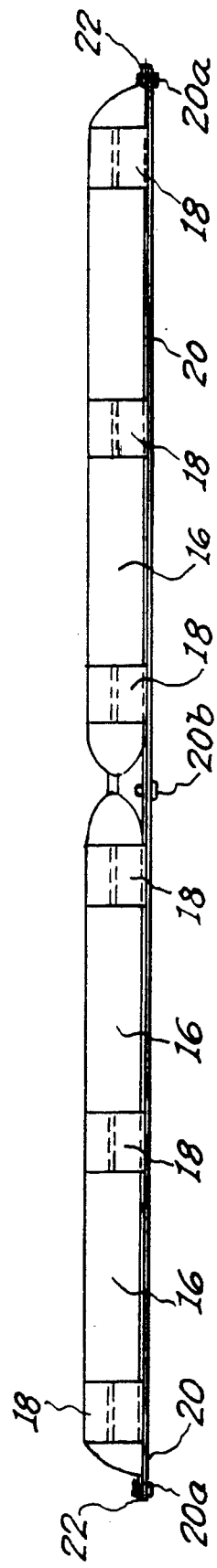
FIG. 4A.
FIG. 5.
FIG. 4B.

5,149,226

FLEXIBLE OIL SPILL CONTAINMENT BOOM

BACKGROUND OF THE INVENTION

1. Field of the Invention

An oil spill containment boom for use between a ship and docking pier to contain oil spills during the loading or unloading of oil products, and specifically to an improved oil spill containment boom which adjusts itself to rapidly changing draft of the abutting ship while maintaining its position with a self-contained flexible bar providing a spring-like tension to the body of the boom which allows the boom to be placed in position between the pier and the ship easily and quickly, usually by one person.

2. Description of the Prior Art

The large world-wide demand for petroleum based products and in particular oil and gasoline has greatly increased the probabilities of oil spills and petro-chemical pollution because shipping dominates the transport of oil and gasoline products throughout the world. Of great concern is the spillage of oil or oil contaminants into bodies of water which provides an immense pollution problem. Of particular concern is the loading or unloading of ships bearing oil from a pier side mooring, usually accomplished by hoses and high pressure pumping systems. Any rupture of the hose or fittings while the hose is disposed over water between the pier and ship usually results in large quantities of oil being dumped into the body of water.

Devices for containing oil spills on a body of water and in particular floating oil spill containment booms are known in the prior art. Devices to contain oil between a transfer vessel and a pier are known. In U.S. Pat. No. 3,766,739 issued Oct. 23, 1973 to MacLean, a system is shown that provides containment between the pier and a ship using a pair of flexible barrier walls which are controlled in length by large pistons connected to the barrier walls. The pistons permit expansion and contraction of the barrier walls between the ship and pier to accommodate movements of the ship while maintaining the barrier wall ends firmly against the ship. Such a system requires the use of expensive pneumatic cylinders and tubes and must be firmly engaged to the containment curtain. Apart from the complexity and cost, the system also requires power assist from a pneumatic source in order to be deployed. Another containment type device is shown in U.S. Pat. No. 3,146,598, issued Sept. 1, 1964 to Smith for an apparatus for confining floating debris employing a floating boom that surrounds the ship while it is anchored in port. The Smith device is time consuming to deploy and requires large amounts of floating boom for extremely large vessels. Deployment of such a system also involves several man hours of work. U.S. Pat. No. 3,599,434, issued Jun. 3, 1969, to Minoud, shows a floatable tube and skirt that is used to surround an oil drilling rig to contain spilled oil. This containment system is large and takes several man hours to deploy.

Conventional oil spill containment booms currently being marketed provide a floatation collar made of a lightweight floatation material that has attached below it a thin flexible sheet that acts as the barrier and a ballast connected along the bottom of the barrier skirt. Such booms may be purchased from American Marine, Inc. of Cocoa, Florida.

One drawback of using these conventionally available floating booms is the necessity of attaching one end of the boom to the ship, normally with a magnet to the hull because the ship's hull does not have suitable connecting elements for ropes attached to the boom ends. Using high speed pumps and hoses, vessel can be loaded or unloaded of oil or other liquid cargo relatively quickly (in hours). This results in large changes in the draft of the vessel in short time periods. Using conventional containment booms and the magnetic connection to the ship hull, without human monitoring or intervention the changing vessel draft will move the containment boom out of position, making the boom ineffective for containing spilled pollutants. For example, as a vessel is rapidly unloaded of an oil cargo the hull can rise several feet. The containment boom firmly attached by a magnet at one end to the ship's hull rises with the hull often above the water line, thereby losing the booms ability to contain a spill. To prevent boom improper positioning due to hull movement, a person is assigned to monitor the boom position. The present invention overcomes this problem by providing a non-complex, inexpensive oil containment boom that includes a self-adjusting tension permitting hull movement without magnetic or rope attachment to the hull while firmly holding the containment barrier wall against the ship's hull at all times.

With the present invention, normally one person can quickly and easily deploy and remove the oil spill containment boom in pairs between a ship and pier. The booms provide for firmly yet flexibly holding each boom securely in position between the ship and pier regardless of motion by the ship while it is moored next to the pier.

SUMMARY OF THE INVENTION

A floatable oil spill containment boom for containing oil spills between a ship and pier comprising an elongated floatation collar, a flexible barrier of a predetermined height disposed along the base of the floatation collar, a flexible elongated rod attached to the floatation collar and one or more plastic sleeves disposed at strategic locations on the floatation collar to protect the floatation collar from tears or cuts which may be caused by barnacles or the like disposed either on the hull of the ship or on the pier wall surfaces The floatation collar includes an elongated flexible sleeve of a water resistant material containing foam or other suitable floatation panels that may be cylindrical in configuration and a flexible sheet skirt or barrier attached to the lower base portion of the collar exterior, all of which act when floating in water to prevent surface oil from passing by or under the barrier. The height of the barrier may vary depending upon the particular loading conditions, but is typically two to three feet in size.

The floatation collar and barrier together make up the flexible containment boom that has rigid, often rectangular flat plates attached vertically at each end of each collar and barrier to provide for abutment to both the ship's hull and the pier. The end plate includes apertures for securing lines that are used to guide the containment boom into position and heretofore to fasten the boom to magnets affixed to the ship's hull (no longer necessary).

The lower edge of the flexible barrier includes a ballast weight to hold the barrier down into the water vertically which may be comprised of a heavy metal weight or steel chain enclosed in a lower edge sleeve of material firmly attached along the lower edge of the barrier wall.

A long thin fiberglass tensioning rod or bar is affixed, preferably end-to-end, longitudinally along the length of the floatation collar so that the flexible floatation collar will conform throughout its length to the position of the elongated bar. As the bar is bowed or bent from end-to-end, the floatation collar and therefore the entire boom will likewise be bent in the disposition of the bar.

In one embodiment, the tension bar is secured to the floatation collar by sections of PVC or other plastic pipe (having a small segment removed for installation expansion) which fits snuggly circumferentialy around a segment of the exterior surface of the collar. A number of protective PVC sleeves are placed at strategic locations along the floatation collar especially near the ends of the barrier. The protective sleeves through which the flexible bar may be inserted at each location will firmly hold the bar to the floatation collar along the length of the barrier. The PVC sleeves have an additional function to protect the floatation collar near the ends of the boom from tearing or ripping which might otherwise be caused by barnacles on the ship's hull or pier surface. The exterior surface of the plastic sleeves contact and engage the ship's hull when the boom is in position between the hull and the pier. Thus the PVC sleeves act as a protective shield for those portions of the oil containment boom which engage either or both the hull of the ship and the pier, while permitting movement of the hull relative to the boom as the ship's draft changes. Preferably the bar is positioned on one side of the floatation collar. When the boom is bowed in position between the ship and the pier, the bar is located on the inside of the arc, in effect, pushing the floating collar against the pier and hull of the ship. This amount is believed to hold the bar and collar more securely together. The ends of the bar are connected by bolts and nuts to the boom end plates, and depending on the boom size and configuration may include a mid-plate to which the bar could be fastened. The plastic protect sleeves hold the bar along the collar between the ends.

In another embodiment which still employs the PVC sleeves to protect the floatation collar, the elongated fiberglass rod or bar can be inserted into the floatation collar itself substantially throughout its entire length.

In operation, one person in most circumstances can deploy a pair of oil spill containment booms in accordance with the present invention through the action of control lines while standing on the pier. Each boom is individually maneuvered (one on each side of the desired water area between the ship and pier to be protected) by manipulating lines attached at each plate such that one end of the boom is positioned against the hull and the other end is positioned against the pier, with each boom being in a bowed configuration causing the elongated flexible bar in each boom to act like a spring, holding each end of the boom against the ship and pier respectively. The tension created by the flexible bar is sufficient to hold each barrier in place but does allow for movement of the hull of the ship relative to the boom end vertically as the ship's draft changes during loading or unloading. The boom collar remains floating on the water surface at all points regardless of the draft change of the ship.

It is an object of this invention to provide an improved oil spill containment boom which will remain in the proper floating position between a ship and pier regardless of changes in the draft of the ship to provide a barrier to prevent oil or other surface contaminants on the water from passing by the barrier.

It is another object of this invention to provide a ship to pier oil spill containment barrier that is flexible, non-complex in construction and operation, which can readily be deployed normally by one person, and which need not be monitored in position during the loading and unloading of the ship.

And yet still another object of this invention is to provide an oil spill containment barrier that includes a protective sleeve to protect the barrier from potential destruction caused by barnacles or other surface matter either on the hull of the ship or on the pier wall surface.

In accordance with these and other objects which will be apparent hereinafter, the instant invention will now be described with particular reference to the accompanying drawings.

BRIEF DESCRIPTION OF THE DRAWINGS

FIG. 1 shows a perspective view of an oil spill containment boom made in accordance with the present invention.

FIG. 2 shows a top plan schematic diagram of the use of a pair of oil spill containment booms deployed in the present invention.

FIG. 4A shows a front elevational view of one embodiment of the present invention FIG. 4B shows a top plan view of the embodiment shown in FIG. 4A.

FIG. 5 shows an end elevational view in cross section through line A—A of FIG. 4A.

FIG. 6 shows a perspective view partially cut away in cross section showing a segment of the present invention.

PREFERRED EMBODIMENT OF THE INVENTION

Figure 3:
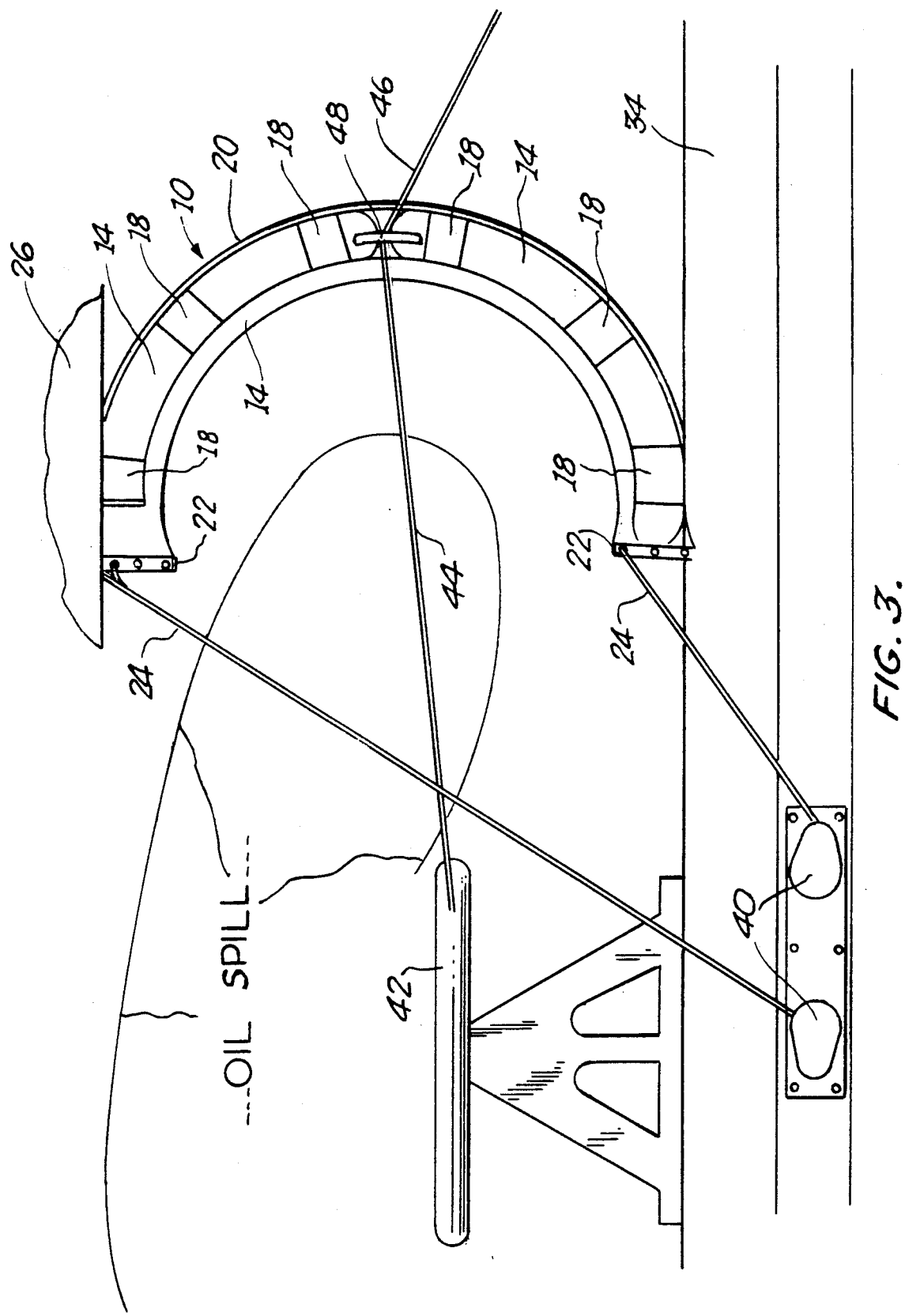
FIG. 3 shows a top plan view of an oil spill containment barrier disposed between the hull of a ship and a pier as used in the present invention.

Referring now to the drawings and in particular FIG. 1, the present invention is shown generally at 10 comprised of a floatable oil containment barrier 12 having a flexible oil barrier 14 made of an elongated flexible sheet of a water resistant fabric of plastic or nylon that is connected along its top edge to a floatation collar 16 which is elongated and may be tubular throughout most of its length. The ends of the barrier include rigid metal plates 22 which abut the ship's hull at one end and a pier at the other end. The plates 22 include apertures 22a that can receive control lines 24 connected at each end of the boom which are used to maneuver the barrier into position.

A plurality of rigid plastic, mostly circular sleeves 18 are attached about the floatation collar 16 at strategic locations to provide a protective areas for portions of the collar 16 to prevent the floatation collar 16 from engaging barnacles residing on the hull of a ship or on the pier which are often so sharp as to cut and destroy the floatation collar exterior fabric sleeve. Also mounted along one side of the floatation collar 16 is an elongated fiberglass rod or bar 20 which fits between sleeve 18 and the exterior surface of the floatation collar 16 and is connected at each end to plates 22.

Disposed along the bottom of barrier 14 is a ballast member 38 which could be a heavy-duty galvanized steel chain connected along the bottom edge to firmly hold the barrier 14 vertically in the water during deployment of the boom.

The elongated fiberglass bar 20 which in the preferred embodiment may be rectangular in cross section and approximately one inch by one-quarter inch in cross section is sized in length so as to extend from one end of the boom to the other. The purpose of bar 20 by virtue of its fiberglass construction, is that the bar can be bent or bowed longitudinally in an arch shape forming a spring-like configuration which because of its elastic and flexible nature provides a tension force at each end of the bar. The protective sleeves 18 cause the floatation collar and barrier to conform to the shape of the bar 20. This allows for the entire boom to be tensioned between the pier and the ship's hull, without attaching the boom with a magnet to the ship. Since no attachment to the ship is required, the boom end abutting the hull has enough tension to remain against the hull at all times but will allow the hull to rise or drop vertically relative to the boom end so that the floatation collar and barrier 20 remain in the proper floating position to contain spillage floating on the water's surface only one person is needed to deploy the device by using the control lines for maneuvering the device between the ship and the pier.

Referring now to FIG. 2, a typical deployment of the device is shown schematically in which two booms 10 are disposed between pier 34 and ship 26. For the transfer of oil from either a ship to shore or from the shore to ship, a high pressure hose 28 is connected to the pumping system 30 on ship 26 and to a receiving or pumping station 32 on pier 34. If during the transfer of oil through hose 28, the hose or a fitting should rupture, any oil leaving the hose and reaching the water 50 will be completely trapped between the floating booms, the pier and the ship. Note in this position that movement of the ship outwardly or inwardly towards or away from the pier will be compensated for by the tension in the booms provided by the flexible bar 20 (FIG. 1). This ensures that the barriers will be held firmly in place without the need for securing them by rope or magnet to the ship during periods of time where ship movement may be caused by tidal changes, waves or winds.

FIG. 3 shows the invention disposed between the pier 34 and ship 26. One set of control lines 24 are tied securely to the end plates 22 and pier cleats 40. Another set of lines 44 and 46 connect the boom to a central fender 42 and the pier (not shown). The PVC sleeves 18 protect the floatation collar 16 from the barnacles on either the ships hull 26 or the pier wall 34.

FIGS. 4A and 4B show the boom 10 and sleeves 18 mounted over collar 16 with the elongated fiberglass rod 20 attached to outside arch of the floatation collar 16 by sleeves 18. The center of the boom in this embodiment has a flexible area 48 as a continuous sheet between collars 16 with a vertical bar 52. Flexible bar 20 is connected to bar 52 by fastener 20b.

FIG. 5 shows the construction of the floatation collar 16 which is a water resistant fabric sleeve encompassing styrofoam or other suitable plastic foam 36 which provides the floatation for the floatation collar. The flexible wall 14 is connected to the bottom of floatation collar 16. The cross section of sleeve 18 is shown with a small break or gap to permit spreading the sleeve for attachment around the floatation collar 16. Note the location of rod or bar 20 which is the elongated fiberglass bar between the outer surface of floatation collar 16 and the inner surface of sleeve 18.

FIG. 6 shows the elongated fiberglass rectangular bar 20 as it fits snuggly under sleeve 18 connected to the end of the boom at the end plate 22 by fastener 20a.

The invention as disclosed has shown a floatable oil spill containment barrier especially adapted for use between ship and pier which in pairs provide a containment zone for use when transferring potential pollutant chemicals. Through the use of containment barriers in accordance with the invention, normally a single operator can place a pair of booms in a tensioned position between the ship and pier. No monitoring of the booms is required regardless of changes in the draft of the ship. The booms will remain securely in place until removed.

The instant invention has been shown and described herein in what it is considered to be the most practical and preferred embodiment. It is recognized, however, that departures may be made therefrom within the scope of the invention and that obvious modifications will occur to a person skilled in the art.

What is claimed:

1. An oil spill containment boom for deployment between a ship and a pier comprising:
   a water floatable barrier to contain a floating substance on the surface of the water, said barrier having an inner and outer surface; and
   an elongated flexible bar attached to said outer surface of said floating barrier, said flexible bar disposed longitudinally along said outer surface of said floatable barrier to provide a spring-like tension to retain said barrier between said ship and said pier.

2. An oil containment boom as in claim 1, wherein:
   said floatation barrier includes a floatation collar and a flexible skirt.

3. An oil containment boom as in claim 2, wherein:
   said elongated flexible bar is disposed on one side of said floatation collar and is secured along the length of said floatation collar by a plurality of sleeves mounted over said floatation collar at strategic locations.

4. An oil containment boom as in claim 1, including:
   a pair of end plates attached at each end of said containment boom, said end plates having a plurality of apertures for receiving control lines and connecting means for connecting said flexible bar to each end of oil containment boom.

5. An oil containment boom as in claim 1, wherein:
   said elongated flexible bar is fiberglass in construction.

6. An oil spill containment boom for deployment between a ship and a pier comprising:
   a water floatable barrier to contain a floating substance on the surface of the water, said floatation barrier including a floatation collar and a flexible skirt; and
   an elongated flexible bar attached to said floating barrier, said flexible bar disposed longitudinally along one side of said floatation collar to provide a spring-like tension to retain said barrier between said ship and said pier, said flexible bar secured along the length of said floatation collar by a plurality of sleeves mounted over said floatation collar at strategic locations.

7. An oil containment boom as in claim 6, including:
   a pair of end plates attached at each end of said containment boom, said end plates having a plurality of apertures for receiving control lines and connecting means for connecting said flexible bar to each end of said oil containment boom.

8. An oil containment boom as in claim 6, wherein:
said elongated flexible bar is fiberglass in construction.

9. An oil spill containment boom for deployment between a ship and a pier comprising:
- a water floatable barrier to contain a floating substance on the surface of the water, said barrier having an inner and outer surface; and
- a linear, flexible bar attached to said outer surface of said floating barrier, said flexible bar disposed longitudinally along said outer surface of said floatable barrier to provide a spring-like tension to retain said barrier between said ship and said pier.

10. An oil containment boom as in claim 9, wherein:
said floatation barrier includes a floatation collar and a flexible skirt.

11. An oil containment boom as in claim 10, wherein:
said elongated flexible bar is disposed on one side of said floatation collar and is secured along the length of said floatation collar by a plurality of sleeves mounted over said floatation collar at strategic locations.

12. An oil containment boom as in claim 9, including:
a pair of end plates attached at each end of said containment boom, said end plates having a plurality of apertures for receiving control lines and connecting means for connecting said flexible bar to each end of said oil containment boom.

13. An oil containment boom as in claim 9, wherein:
said elongated flexible bar is fiberglass in construction.

* * * * *